US007225300B1

(12) United States Patent
Choquette et al.

(10) Patent No.: US 7,225,300 B1
(45) Date of Patent: May 29, 2007

(54) DUPLICATE SNOOP TAGS PARTITIONED ACROSS MULTIPLE PROCESSOR/CACHE CHIPS IN A MULTI-PROCESSOR SYSTEM

(75) Inventors: Jack H. Choquette, Mountain View, CA (US); David A. Kruckemyer, Mountain View, CA (US); Robert G. Hathaway, Sunnyvale, CA (US)

(73) Assignee: Azul Systems, Inc, Mountain View, CA (US)

( * ) Notice: Subject to any disclaimer, the term of this patent is extended or adjusted under 35 U.S.C. 154(b) by 398 days.

(21) Appl. No.: 10/711,387

(22) Filed: Sep. 15, 2004

(51) Int. Cl.
*G06F 13/00* (2006.01)
*G06F 12/00* (2006.01)

(52) U.S. Cl. .................. 711/146; 711/140; 711/147; 711/119

(58) Field of Classification Search .............. None
See application file for complete search history.

(56) References Cited

U.S. PATENT DOCUMENTS

| | | | |
|---|---|---|---|
| 5,590,310 A | 12/1996 | Willenz et al. | 711/146 |
| 5,634,068 A | 5/1997 | Nishtala et al. | 711/141 |
| 5,765,196 A | 6/1998 | Liencres et al. | 711/143 |
| 5,946,709 A | 8/1999 | Arimilli et al. | 711/119 |
| 5,978,886 A | 11/1999 | Moncton et al. | 711/118 |
| 6,076,147 A | 6/2000 | Lynch et al. | 711/146 |
| 6,108,752 A | 8/2000 | VanDoren et al. | 711/117 |
| 6,272,602 B1 | 8/2001 | Singhal et al. | 711/144 |
| 6,493,797 B1 | 12/2002 | Lee et al. | 711/118 |
| 2002/0087807 A1 | 7/2002 | Gharachorloo et al. | 711/141 |
| 2002/0174305 A1 | 11/2002 | Vartti | 711/145 |
| 2004/0068616 A1 | 4/2004 | Tierney et al. | 711/141 |

*Primary Examiner*—Hyung Sough
*Assistant Examiner*—Mardochee Chery
(74) *Attorney, Agent, or Firm*—g Patent LLC; Stuart T. Auvinen

(57) ABSTRACT

Several cluster chips and a shared main memory are connected by interconnect buses. Each cluster chip has multiple processors using multiple level-2 local caches, two memory controllers and two snoop tag partitions. The interconnect buses connect all local caches to all snoop tag partitions on all cluster chips. Each snoop tag partition has all the system's snoop tags for a partition of the main memory space. The snoop index is a subset of the cache index, with remaining chip-select and interleave address bits selecting which of the snoop tag partitions on the multiple cluster chips stores snoop tags for that address. The number of snoop entries in a snoop set is equal to a total number of cache entries in one cache index for all local caches on all cluster chips. Cache coherency request processing is distributed among the snoop tag partitions on different cluster chips, reducing bottlenecks.

20 Claims, 12 Drawing Sheets

DUPLICATE SNOOP TAGS PARTITIONED ACROSS MULTIPLE PROCESSOR/CACHE CHIPS IN A MULTI-PROCESSOR SYSTEM

BACKGROUND OF THE INVENTION

This invention relates to multi-processor systems, and more particularly to snoop tags for caches in a multi-processor system.

One challenge to designing systems with multiple processors is sharing of resources, especially memory. A main memory may be shared among several processors by transferring portions of the main memory to caches near the processors. However, sometimes more than one processor may request the same line in main memory. Keeping the shared memory line coherent may require tracking which processor caches have a copy of the cache line at any time. As the line is written to, other copies of the old line must be updated or invalidated.

FIG. 1 is a diagram of a multi-processor system with a memory-coherency directory. Central processing unit (CPU) processor 20 temporarily stores instructions and data in cache 14, while second CPU 22 temporarily stores its instructions and data in cache 16. Eventually data is written back to main memory 10, which also supplies new instructions and data for processing to caches 14, 16.

Each memory line 18 in main memory 10 can have an entry 28 in memory directory 12. Entry 28 indicates which of caches 14, 16 has a copy of line 18, and whether the line has been written (dirty) and possibly other information. Caches 14, 16 store a tag portion of the address along with the data in cache lines 24, 26. Cache lines 24, 26 can have a different size than memory line 18.

Memory directory 12 is a central location to track the states and locations of copies of all memory lines in the system. All coherency is typically resolved at memory directory 12. As more processors and caches share main memory 10, bottlenecks can increase at this central coherency directory.

The size of memory directory 12 can be quite large. Main memory 10 is usually much larger than caches 14, 16. Memory directory 12 may store one entry for each line in main memory 10, often requiring a huge number of entries for a large memory such as a 4 Giga-byte memory. Directories may have bandwidth requirements that increase proportionally to main memory bandwidth. Since directories are designed with memory controllers this can be synergetic: add more memory bandwidth and obtain more directory bandwidth. Another characteristic is that the directory size is proportional with the memory size. Memory can get really big, so directories also get really big, perhaps prohibiting placing directories on-chip.

FIG. 2 is a multi-processor system with duplicate tags for coherency snooping. Rather than tracking memory line coherency on a per-memory-line basis in memory directory 12, the caches may themselves track cache-line coherency on a per-cache-line basis. When a cache requests to write to a line, it broadcasts the line's address to all other caches in the multi-processor system. The other caches compare the line's address to tags in the local caches and invalidate the cache line if a tag matches.

Since each cache is often busy supplying instructions and data to its local processor, there may be little available bandwidth to the cache tags for comparing broadcast snoops. A second copy of the tags can be kept for each cache to provide access to these broadcast snoops from other caches.

Duplicate tags 30 are a copy of the tags in cache 14 for addresses of valid cache lines in cache 14 used by processor 20. Duplicate tag 34 can contain a copy of the tag address, and other coherency information such as whether the line is dirty, valid, or owned by the local processor cache. Other caches such as second cache 16 also has duplicate tags 32 for cache lines stored in second cache 16.

When processor 20 desires to write to cache line 24 in cache 14, cache 14 broadcasts the tag in a request to all other caches. Second cache 16 receives the request and compares the broadcast address tag to its duplicate tags 32, finding a match with duplicate tag 36. Cache line 26 in second cache 16 is then invalidated to maintain coherency. More complex coherency schemes may also be implemented.

Since each cache maintains its own duplicate tags 30, 32, coherency processing is distributed among caches 14, 16, preventing a bottleneck. A much smaller number of duplicate tag entries are needed than for memory directory 12 (FIG. 1) since caches 14, 16 are much smaller than main memory 10. Snoop tags have a size that is proportional to the size of the caches. Since snoop tags tend to be designed with caches this is synergetic: adding more cache also adds snoop tag capacity. Also, the snoop tag bandwidth is proportional to the memory bandwidth and the number of caches. One failing of traditional snoop tag designs is that communication bandwidth is also proportional to both memory bandwidth and the number of caches. This quickly turns into a bottleneck as systems become larger.

FIG. 3 is a multi-processor system with a central location for duplicate tags for coherency snooping. Rather than having duplicate tags with each cache, a central snoop directory can store all duplicate tags. Cache line 24 in cache 14 has an entry in central duplicate tags 40 that indicates that the cache line is present in cache 14, and whether the line has been written (dirty). Likewise, cache line 26 in second cache 16 has an entry in central duplicate tags 40. When a cache line exists in more than one cache, entry 38 in central duplicate tags 40 can indicate which caches have the line, and which copies have been written.

Since coherency operations are preformed by central duplicate tags 40, caches 14, 16 do not have to be interrupted for comparing snoop addresses to cache tags. However, a bottleneck at central duplicate tags 40 can result, especially when the number of caches and processors is expanded.

What is desired is a multi-processor system that can expand the number of processors and local caches, while still providing cache-line coherency. Cache-line-base rather than memory-line-base coherency is desired to reduce the size of the coherency directory.

DETAILED DESCRIPTION

The present invention relates to an improvement in cache coherency. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
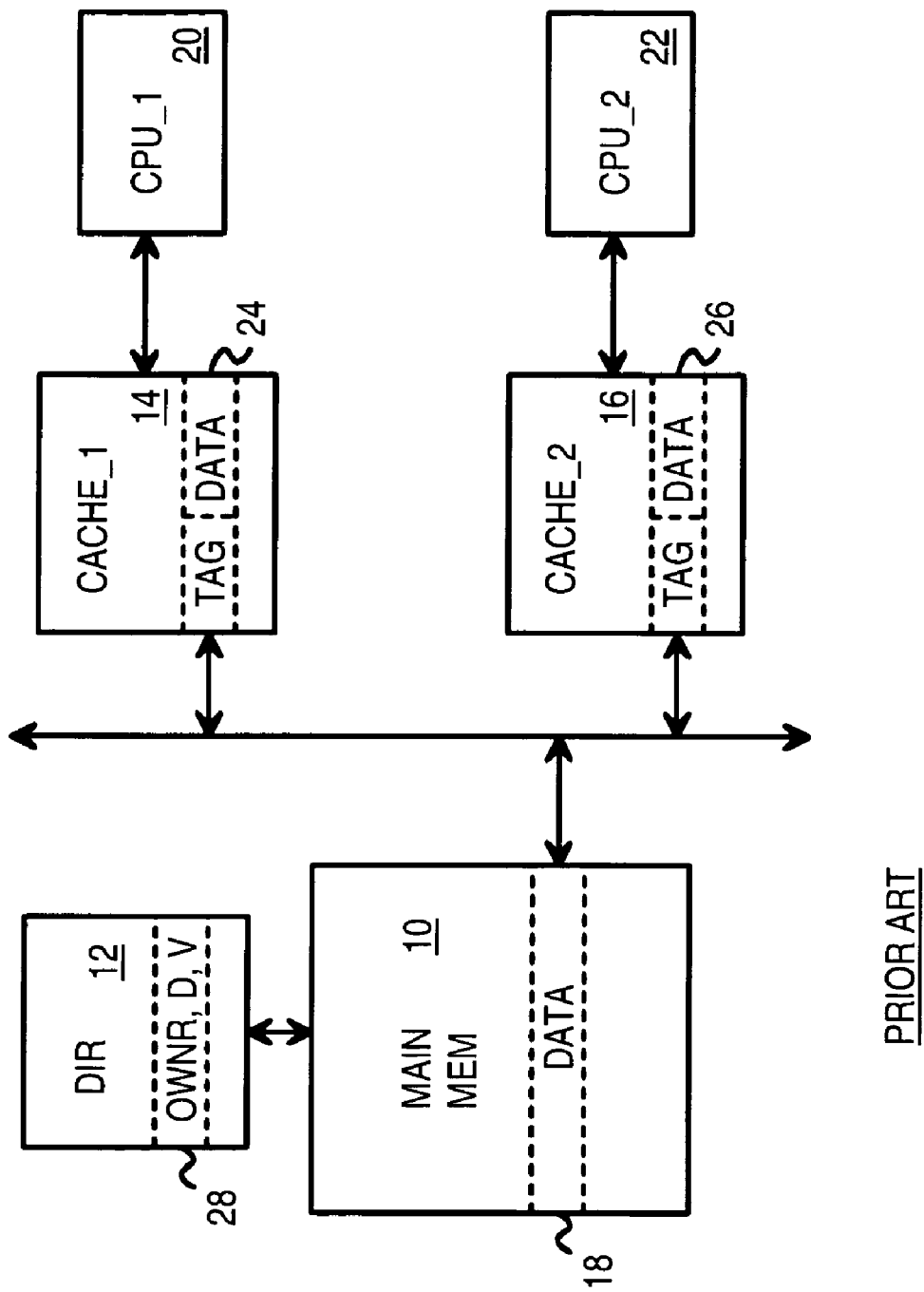
FIG. 1 is a diagram of a multi-processor system with a memory-coherency directory.
Figure 2:
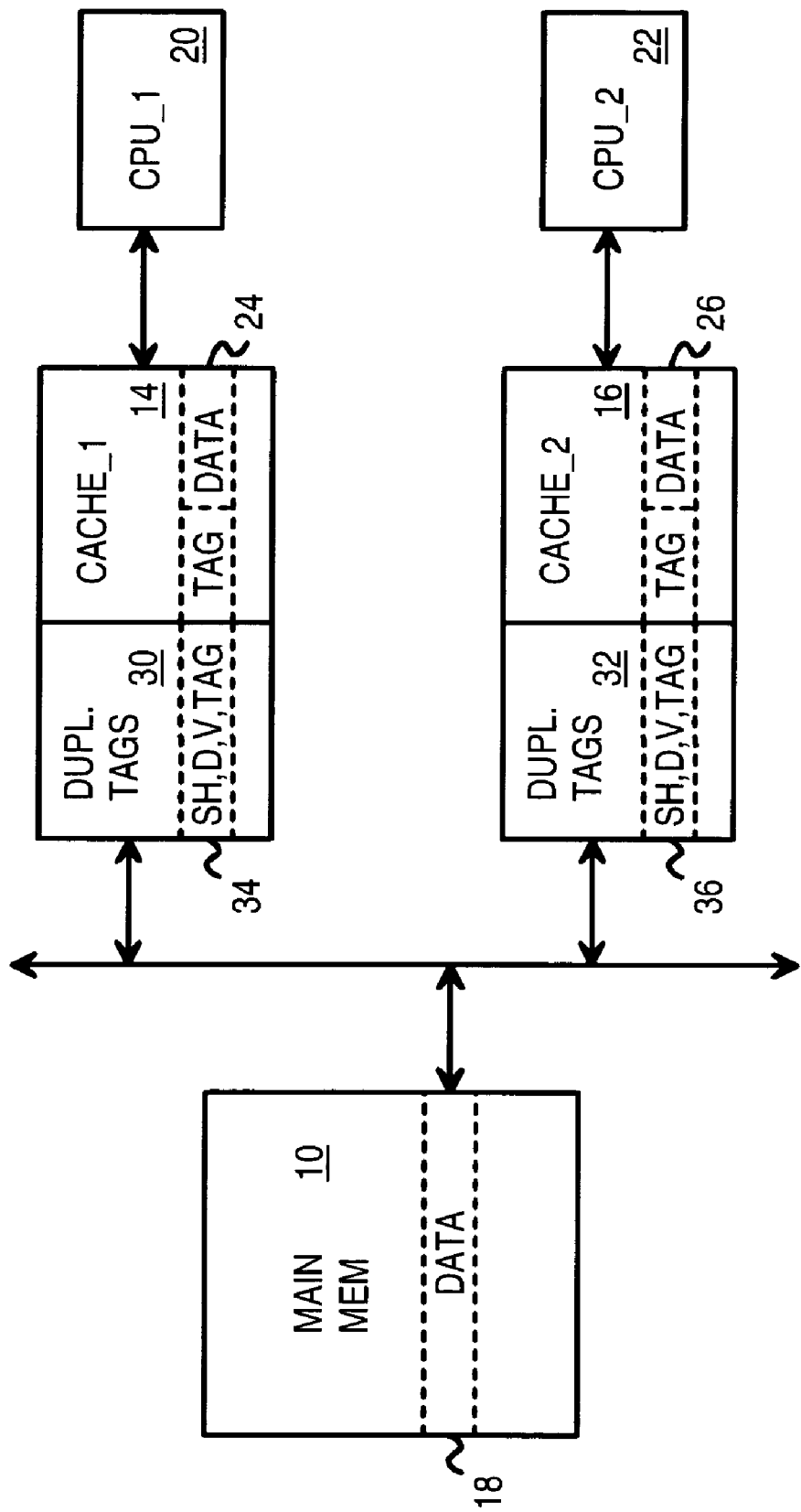
FIG. 2 is a multi-processor system with duplicate tags for coherency snooping.
Figure 3:
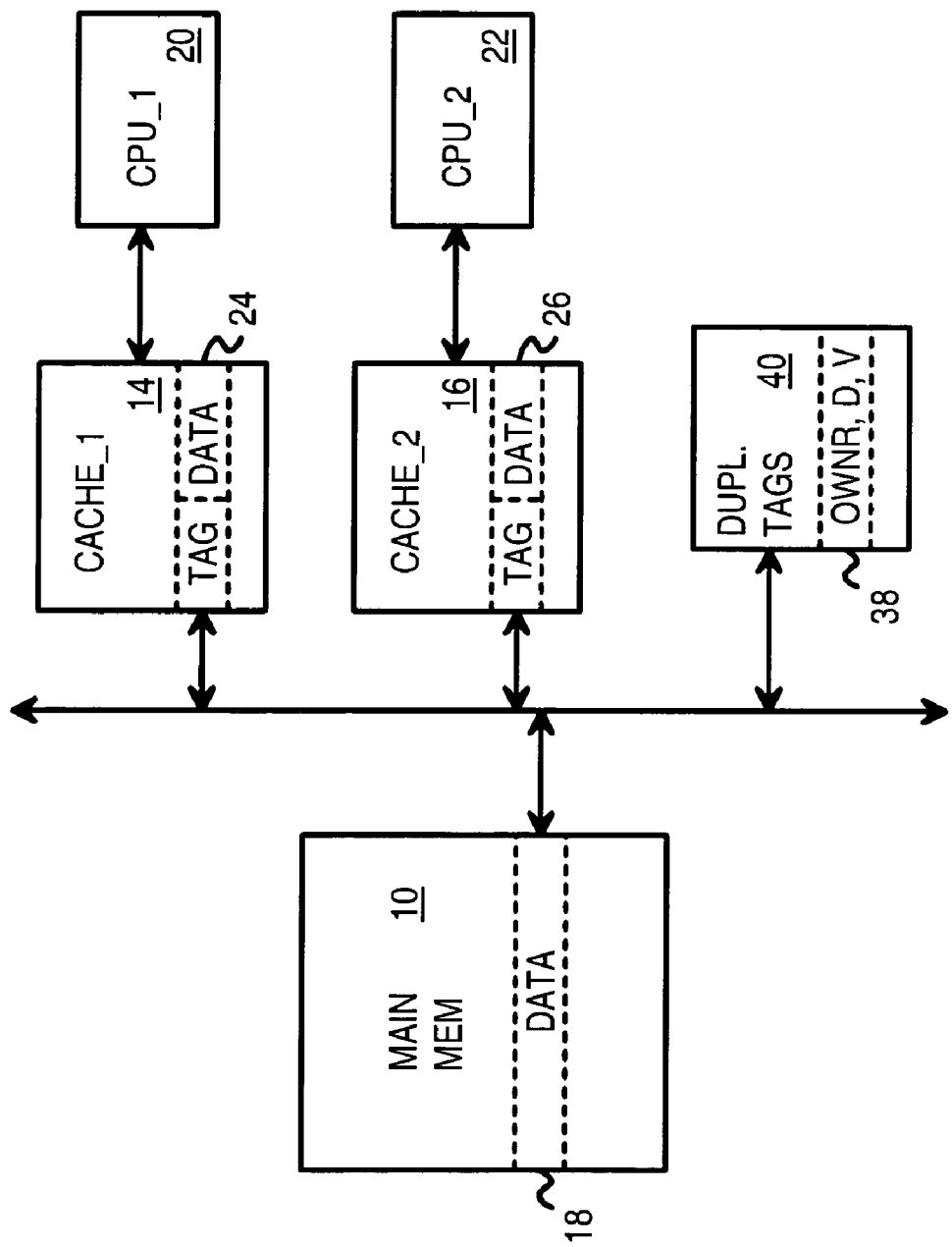
FIG. 3 is a multi-processor system with a central location for duplicate tags for coherency snooping.
Figure 4:
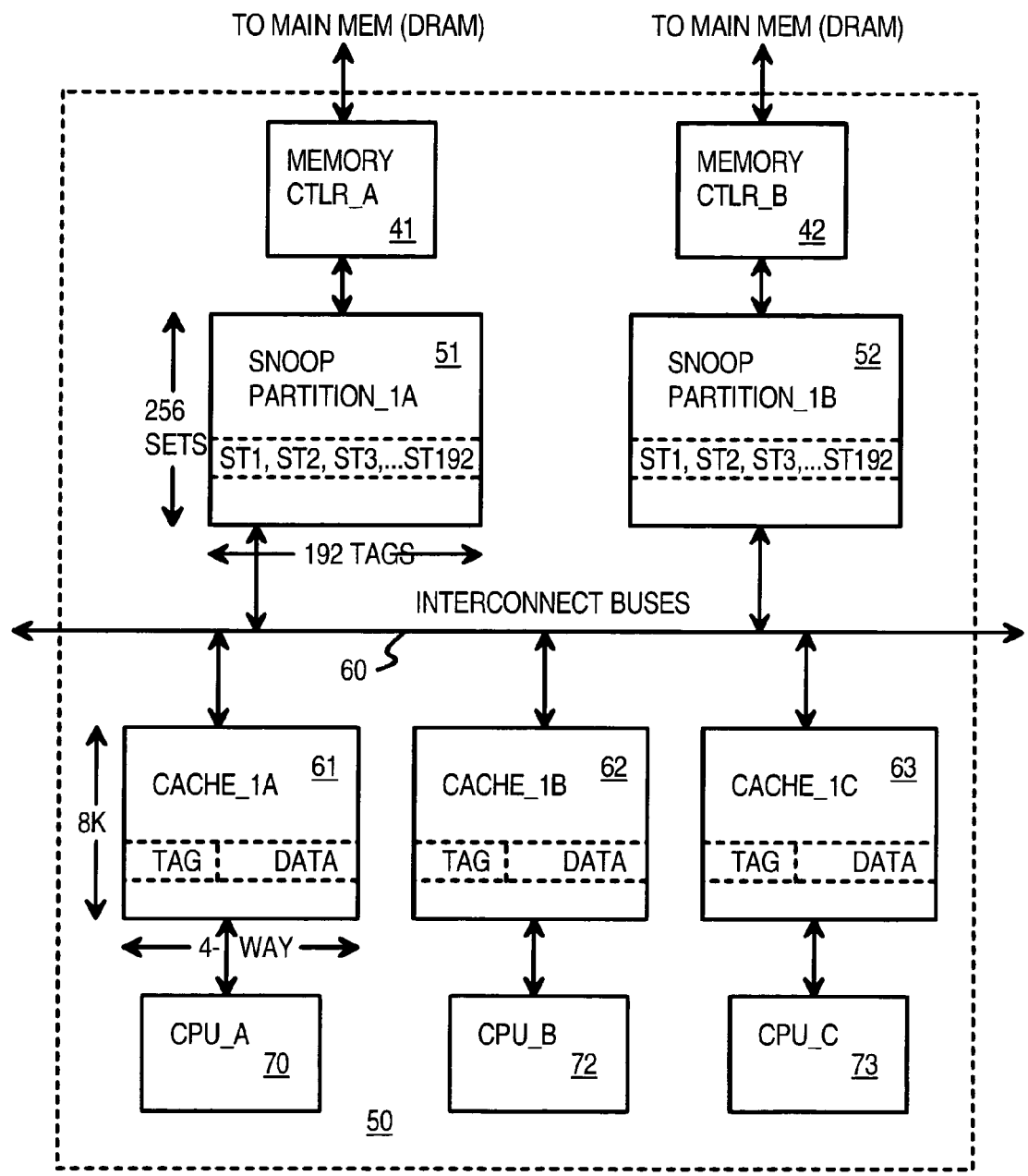
FIG. 4 shows a multi-processor chip with multiple caches and partitioned snoop tags.

FIG. 4 shows a multi-processor chip with multiple caches and partitioned snoop tags. Cluster chip 50 contains three processors, CPUs 70, 72, 73 and three local caches 61, 62, 63, which can be level-2 caches when level-1 caches are part of CPUs 70, 72, 73. Caches 61, 62, 63 contain cache tags and data, and are each arranged as 4-way set-associative caches having 8K sets or indexes. One set of four entries is selected by a 13-bit index value, while a 22-bit cache tag portion of the address is matched to one of the four tags in the set.

Main memory is accessible by memory channels or memory buses that connect to memory controllers 41, 42 on each cluster chip 50. Each memory controller 41, 42 has a dedicated snoop tag partition 51, 52 that can operate in parallel or in series with the memory access to update cache coherency information as cache lines are moved in and out of local caches 61, 62, 63 or caches on other cluster chips 50.

Interconnect buses 60 internally connect local caches 61, 62, 63 and snoop tag partitions 51, 52. Interconnect buses 60 also connect off-chip to local caches and snoop tag partitions in other cluster chips 50. In one embodiment, interconnect buses 60 can include an external cross-link interconnect of many point-to-point buses that connect each cluster chip 50 to all other chips 50. For example, in a 16-chip system, each cluster chip 50 can have 15 input port from the other 15 chips 50, and 15 output ports to the other 15 chips 50. A total of 240 external point-to-point buses (15 ports×16 chips) each connect one output port to one input port of two different chips 50.

The system is expandable by adding more chips 50. Each additional cluster chip 50 adds three more processor cores and two more snoop tag partitions 51, 52, each with a channel to main memory through memory controllers 41, 42. A system can have up to 16 chips 50 in one embodiment. A 16-chip system has 48 CPU cores, 48 level-2 caches, 32 memory controllers and channels to main memory, and 32 snoop tag partitions.

Main memory is shared by all chips 50 and is accessible by memory channels or memory buses that connect to memory controllers 41, 42 on each cluster chip 50. Data from main memory may be stored in any of the local caches 61, 62, 63 in any of the 16 chips 50 in a system. When data is loaded into a local cache, a snoop entry is also loaded into one of the snoop tag partitions. The snoop entry is updated when a processor desired to write to the cache line, or when another local cache request the same cache line. Identifiers for the local caches that own or share the cache line are also stored in the snoop entry.

Each of snoop tag partitions 51, 52 contains many snoop tags per snoop index. The snoop index is an 8-bit portion of the 13-bit cache index into local caches 61, 62, 63. The 8-bit snoop index selects one of 256 sets of snoop tags.

Figure 5:
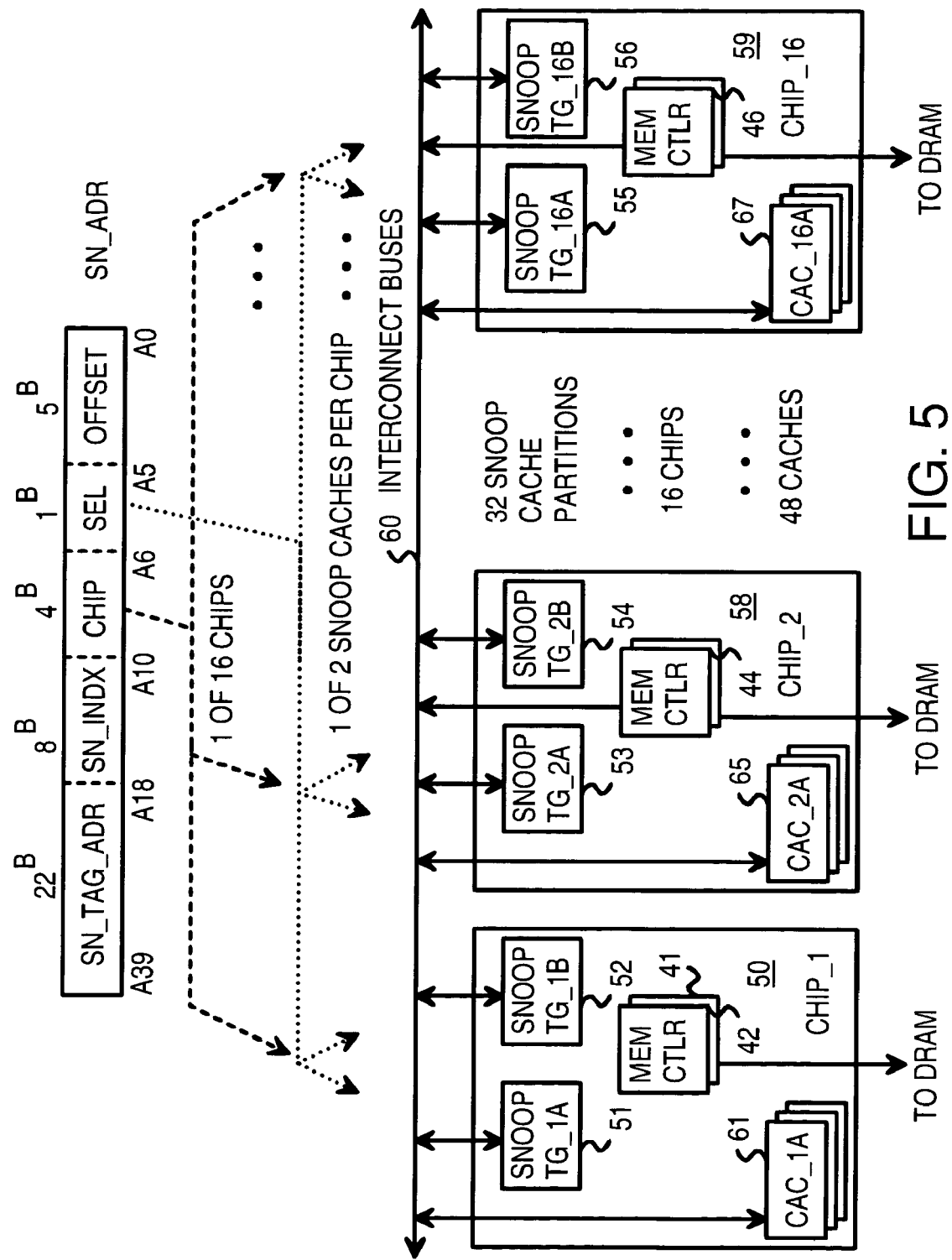
FIG. 5 shows snoop tags partitioned across a multi-chip system.

Partitioned Snoop Tags—FIG. 5

Rather than have a central directory of snoop tags, the snoop tags are distributed across the chips in the system. FIG. 5 shows snoop tags partitioned across a multi-chip system. Chips 50, 58, 59 are three of up to 16 chips in a system, each having three CPU cores and three local caches, two memory controllers and two snoop tag partitions. For example, second chip 58 has three local caches 65, two memory controllers 44, and snoop tag partitions 53, 55. Interconnect buses 60 route snoop address and data from a memory controller and snoop tag partition to one of the local caches on any of the 16 chips 50, 58, 59.

A 40-bit snoop address can be divided into several sections, such as a 5-bit offset within a cache line, a 1-bit interleave select bit that selects one of the two snoop tag partitions on a chip, and a 4-bit chip-select field that selects one of up to 16 chips 50, 58, 59. The snoop address also has a 22-bit snoop tag that is compared with snoop tags stored in the selected index to find a match, an 8-bit snoop index that selects one of 256 sets of snoop tags. The snoop index is an 8-bit subset of the 13-bit cache index into local caches 61, 62, 63.

Snoop address bit A5, the interleave select bit, selects one of the two snoop tag partitions on the selected chip. For example, when last chip 59 is selected, and A5=0, snoop tag partition 55 is selected, but when A5=1, snoop tag partition 56 is selected.

Snoop address bits A9:A6 are chip-select bits that select one of the 16 chips 50, 58, 59. When A9:A6=0000, one of snoop tag partitions 51, 52 on cluster chip 50 is selected, while when A9:A6=1111, one of snoop tag partitions 55, 56 on chip 59 is selected.

In a simplified example of a 1-chip system with only one cluster chip 50, snoop tag partition 51 is responsible for half the physical addresses, while snoop tag partition 52 is responsible for the other half of the physical addresses.

Address bit 5 can be used to divide the physical address space between snoop tag partitions 51, 52. When local cache 61 loads a cache line with A5=0, snoop tag partition 51 loads the snoop tag for this cache line, and memory controller 41 connected to snoop tag partition 51 is used to fetch the line from main memory. However, when local cache 61 loads a cache line with A5=1, snoop tag partition 52 loads the snoop tag for this cache line, and memory controller 42 connected to snoop tag partition 52 is used to fetch the line from main memory. Thus memory accesses and snoop tags are partitioned using one or more of the physical address bits. This helps to distribute memory-access and coherency-processing loads.

When more than one cluster chip 50 is in a system, additional address bits can be used to divide the physical address space among the chips. For example, a 16-chip system can use four address bits A9:A6 as chip-select bits to select one of the 16 chips, and then use A5 to select one of the two snoop tag partitions 51, 52 on the selected chip. Each of the 32 snoop tag partitions 51, 52, 53, 54, . . . 55, 56 is responsible for a ⅟₃₂nd portion of the physical address space in main memory.

In another example a 4-chip system can use two address bits A7:A6 to select one of the 16 chips, and then use A5 to select one of the two snoop tag partitions 51, 52 on the selected chip. The number of snoop index bits increases, increasing the number of snoop sets in the snoop tag partitions. Each of the 8 snoop tag partitions 51, 52, 53, 54, . . . 55, 56 is then responsible for a ⅛th portion of the physical address space in main memory.

Figure 6:
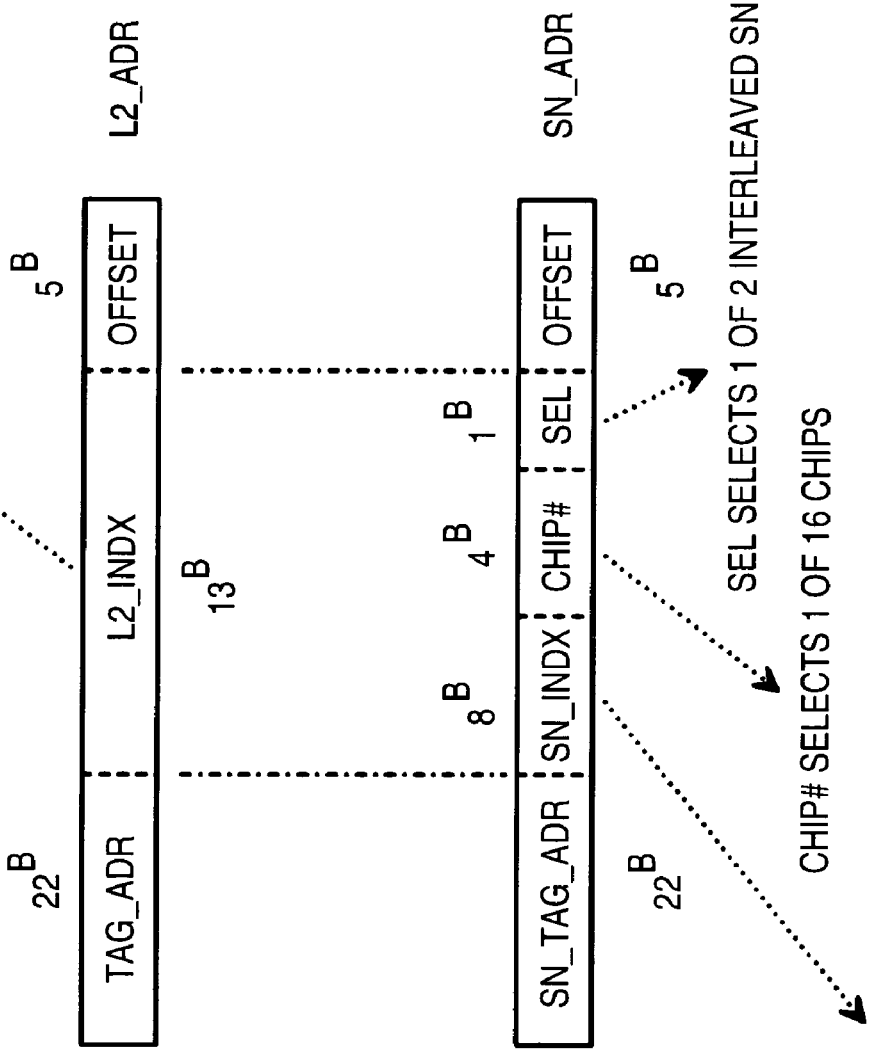
FIG. 6 highlights the correspondence of local cache and snoop indexes, tags, and select bits.

FIG. 6 highlights the correspondence of local cache and snoop indexes, tags, and select bits. The local-cache address and the snoop address are 40-bit addresses, generated by a local CPU, local cache, or a coherency engine associated with a snoop tag partitions. The lower 5 bits, A4:A0, are the byte offset within a cache line of 32 bytes. These offset address bits are usually not needed by the snoop tag partitions that operate on a cache-line basis, and are not shown in the Figure.

The upper 22 bits are tag bits that are stored in the local cache as the cache tag address, and stored in one of the snoop tag partitions as a snoop tag address. Since the local cache is set-associative, these tag bits are compared with the four tags stored in a set to find which of the four entries is matching in the local cache. Similarly, these tag bits are compared with the tags stored in a snoop-partition set to find which of the entries is matching in the selected snoop tag partitions.

The middle 13 bits, A17:A5, are the index into the local cache. This index selects one of 8,192 rows or sets in the local cache making or receiving the data or coherency operation request. Each row in the local cache has four entries for a 4-way set-associative cache, and each entry has a tag that must be compared, data, and valid, dirty, and perhaps other cache-management bits such as least-recently-used (LRU) bits.

The middle 13 bits, A17:A5, are further divided for the snoop address. The lowest cache-index bit, A5, is the interleave bit that selects one of the two snoop tag partitions on a chip. Chip-select bits A9:A6 select one of 16 chips in a system. When the system has fewer than 16 chips, fewer chip-select bits are needed and the unneeded chip-select bits are added to the snoop index.

Upper index bits A17:A10 are the snoop index bits. These 8 bits select one of 256 rows or sets of snoop tags within the selected snoop tag partition. Each set of snoop tags can have multiple snoop entries, each with a different snoop tag, since the snoop tag partitions are set-associative.

All the tags at a particular cache index are stored at the same snoop tag and snoop index. This provides the benefit of an atomic lookup in one partition without having to check in multiple snoop tag partitions to determine what coherence actions are required.

Figure 7:
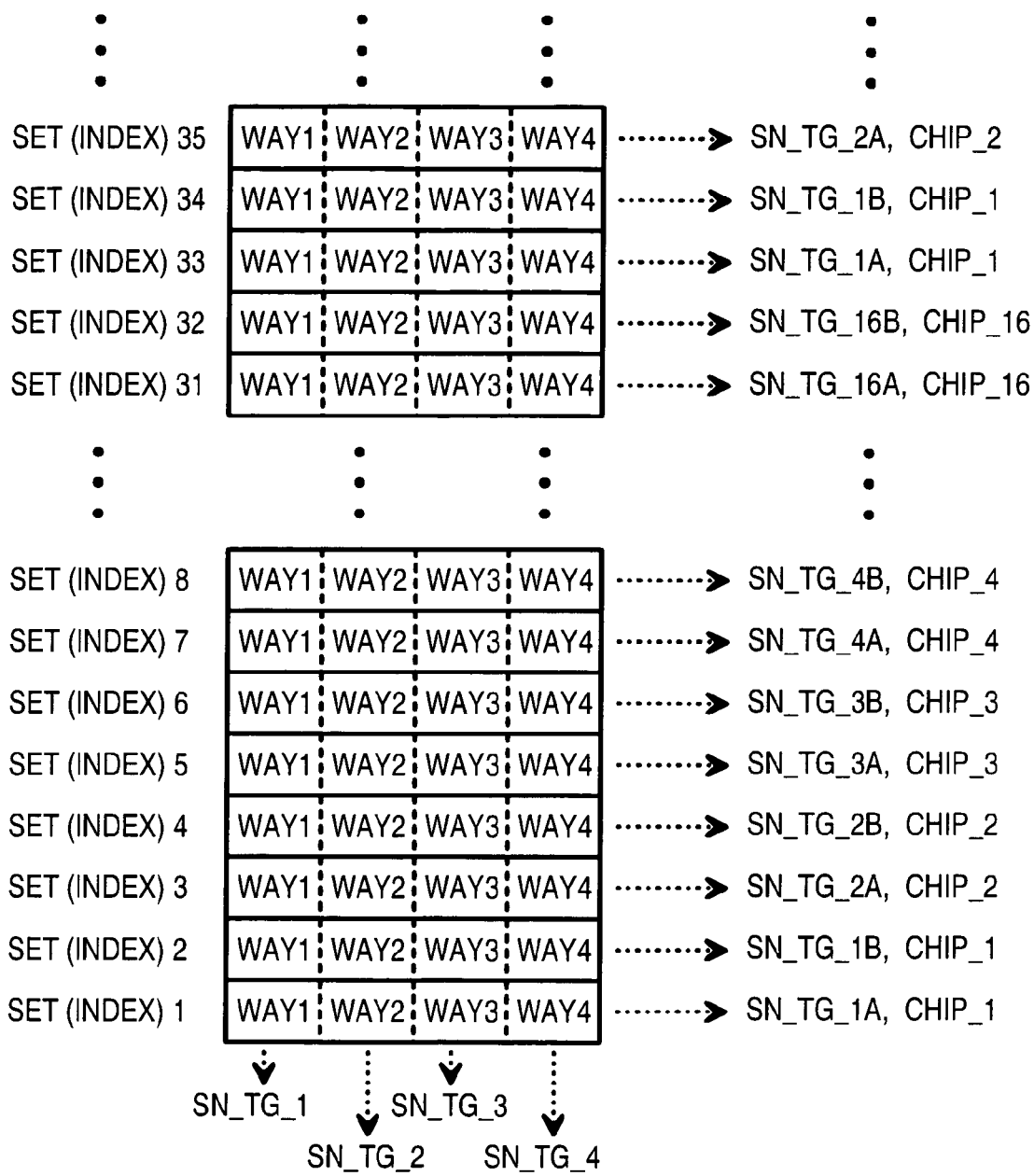
FIG. 7 shows mapping of entries in a 4-way set-associative local cache to snoop tag partitions across 16 chips.

FIG. 7 shows mapping of entries in a 4-way set-associative local cache to snoop tag partitions across 16 chips. Local cache 61 has four entries per set, and has 8K sets selected by the 13-bit cache index. The first set, index 1, is selected by the index bits being 0000000000000. The first set has four entries, each having a tag and data and cache management bits such as valid and dirty. These four entries map to first cluster chip 50, and to first snoop tag partition 51 (FIG. 5). The four entries are stored in the first four snoop tags stored in the snoop set of the first snoop index.

The second cache set, index 2, also has four entries that correspond to four of the snoop tags stored in the snoop set of the first snoop index of first cluster chip 50, but for second snoop tag partition 52.

The third cache set, index 3, has four entries that correspond to four of the snoop tags stored in the snoop set of the first snoop index of second chip 58, for first snoop tag partition 53. The fourth cache set, index 4, has four entries that correspond to four of the snoop tags stored in the snoop set of the first snoop index of second chip 58, for second snoop tag partition 54.

Entries and sets continue to map to snoop tag partitions in other chips in the 16-chip system in the same manner. Finally, the 31st cache set, index 31, has four entries that correspond to four of the snoop tags stored in the snoop set of the first snoop index of last chip 59, for first snoop tag partition 55. The 32nd cache set, index 32, has four entries that correspond to four of the snoop tags stored in the snoop set of the first snoop index of last chip 59, for second snoop tag partition 56. Then the mapping repeats with first cluster chip 50 for the 33rd index, but for the second index in snoop tag partition 51.

Other local caches have similar mappings. Second local cache 62 on cluster chip 50 has four entries in the first set that map to other snoop-tag entries in snoop tag partition 51, and four entries in the second set that map to another 4 snoop-tag entries in snoop tag partition 52 in cluster chip 50. The third set (cache index) maps to another 4 snoop-tag entries in snoop tag partition 53 in chip 58, etc.

Collisions in the Snoop Tag Partitions

Each snoop-tag index can store up to 192 different snoop tags per chip and snoop tag partition. The 192 snoop-tag entries are distributed among all local caches. A given cache index, in any of the local caches, maps to only one of the 32 snoop tag partitions since the chip-select and interleave bits are fixed by the cache index.

Each cache has just one cache index (set) that maps to one snoop index in one of the 32 snoop tag partitions, since there are 8K cache indexes but only 256 snoop indexes. In the worst case, all 48 local caches could have different tags but the same cache index. Since each cache is 4-way set-associative, there could be 48×4 or 192 different snoop tags to store.

When two or more local caches have copies of the same cache line, with the same cache/snoop tag, they each have a snoop-tag entry in the same snoop-tag index. All 192 entries are searched when loading a new line to look for a matching tag. This search determines if another cache is sharing that cache line when the new line is loaded.

Figure 8:
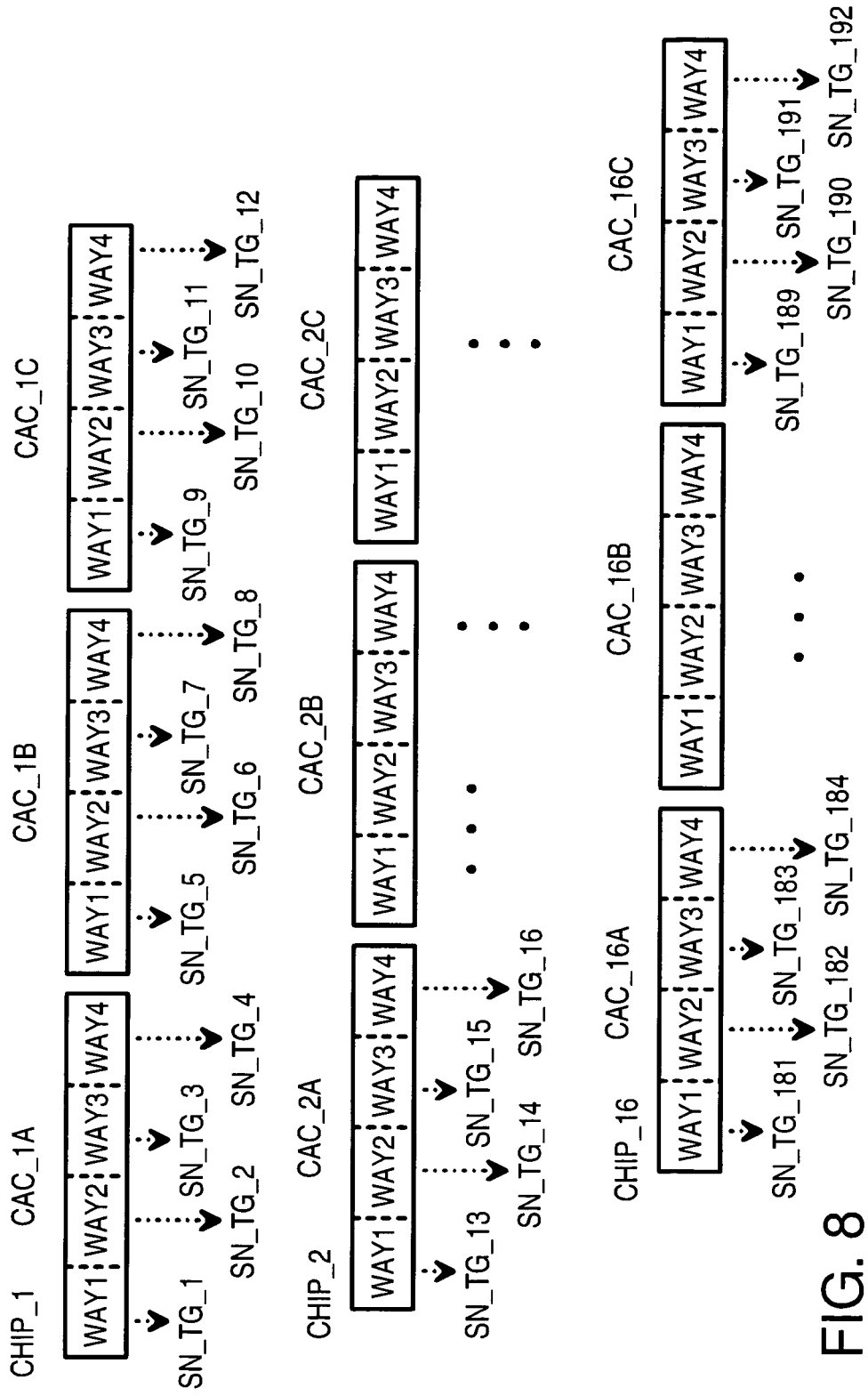
FIG. 8 shows mapping of snoop-tag entries in one snoop index in one of the snoop tag partitions.

FIG. 8 shows mapping of snoop-tag entries in one snoop index in one of the snoop tag partitions. A snoop index selects one of 256 snoop sets. The chip-select bits select one of the 16 chips, while the interleave bit selects one of the two snoop tag partitions per chip. One of these 256 snoop sets is shown, for the selected snoop tag partition in the selected chip. Each snoop tag partition has 192 snoop-tag entries per set, for the 192 possible snoop entries from all 4 ways of each of the 48 local caches in all the chips. These 192 snoop-tag entries are shown as SN_TG_1, SN_TG_2, . . . SN_TG_192.

The first four snoop-tag entries SN_TG_1, SN_TG_2, SN_TG_3, SN_TG_4, receive snoop tags for cache lines in local cache 61 in cluster chip 50. The next four snoop-tag entries SN_TG_5, SN_TG_6, SN_TG_7, SN_TG_8 in snoop tag partition 51 receive snoop tags for cache lines in second local cache 62 in cluster chip 50. The next four snoop-tag entries SN_TG_9, SN_TG_10, SN_TG_11, SN_TG_12 in snoop tag partition 51 receive snoop tags for cache lines in third local cache 63 in cluster chip 50.

Snoop tags SN_TG_13 to SN_TG_16 receive snoop tags for the 4 ways in first local cache 65 in second chip 58. Snoop tags SN_TG_17 to SN_TG_20 receive snoop tags for the 4 ways in second local cache 65 in second chip 58, while snoop tags SN_TG_21 to SN_TG_24 receive snoop tags for the 4 ways in third local cache 65 in second chip 58. The other 14 chips each have 3 local caches with 4 ways per set, filling snoop tags SN_TG_25 to SN_TG_192.

The owner of each snoop-tag entry can be determined by its location within the 192 snoop tags per snoop line. When two caches share a line, there are two entries in the snoop tag partition, one for each cache. In theory, up to 48 caches can all share the line, so there could be 48 snoop tag entries with the same physical address. A cache may only have a single copy of the cache line, represented by a single snoop tag entry for that cache, but the copy may be in any of the four ways. When a new request arrives at a snoop tag partition, the snoop index is used to select the 192 entries, and an address comparison is performed on each entry. Because each snoop tag entry represents a way in a particular cache, each match indicates that a cache has a copy of the cache line. The new request also has a cache and a way associated with it, and the snoop tag entry at the corresponding cache and way is replaced by a new entry represented by the new request address. Subsequent requests to the same address will match on the new entry.

There is a one-to-one correspondence between cache tags and snoop tags. The total number of cache-tag entries in the system equals the total number of snoop-tag entries. For example, the 4-way, 16-chip system described herein has 4-Way×16 chips×3 caches/chip×8K sets=1,572,864 cache tag entries, and 192 snoop tags/set×256 sets×16 chips×2 snoops/chip=1,572,864 snoop tag entries. If the local caches were 8-way set-associative, the number of snoop tag entries would double to 384 per set to compensate. If only 4 chips were present, there would be 393,216 cache tag entries, and 48 snoop tags per snoop set, but 1 K snoop indexes. A 2-chip system has 2K snoop indexes and only 24 snoop tags per snoop set. The snoop tag partition memory can be re-arranged as additional cluster chips are added to the system.

Figure 9:
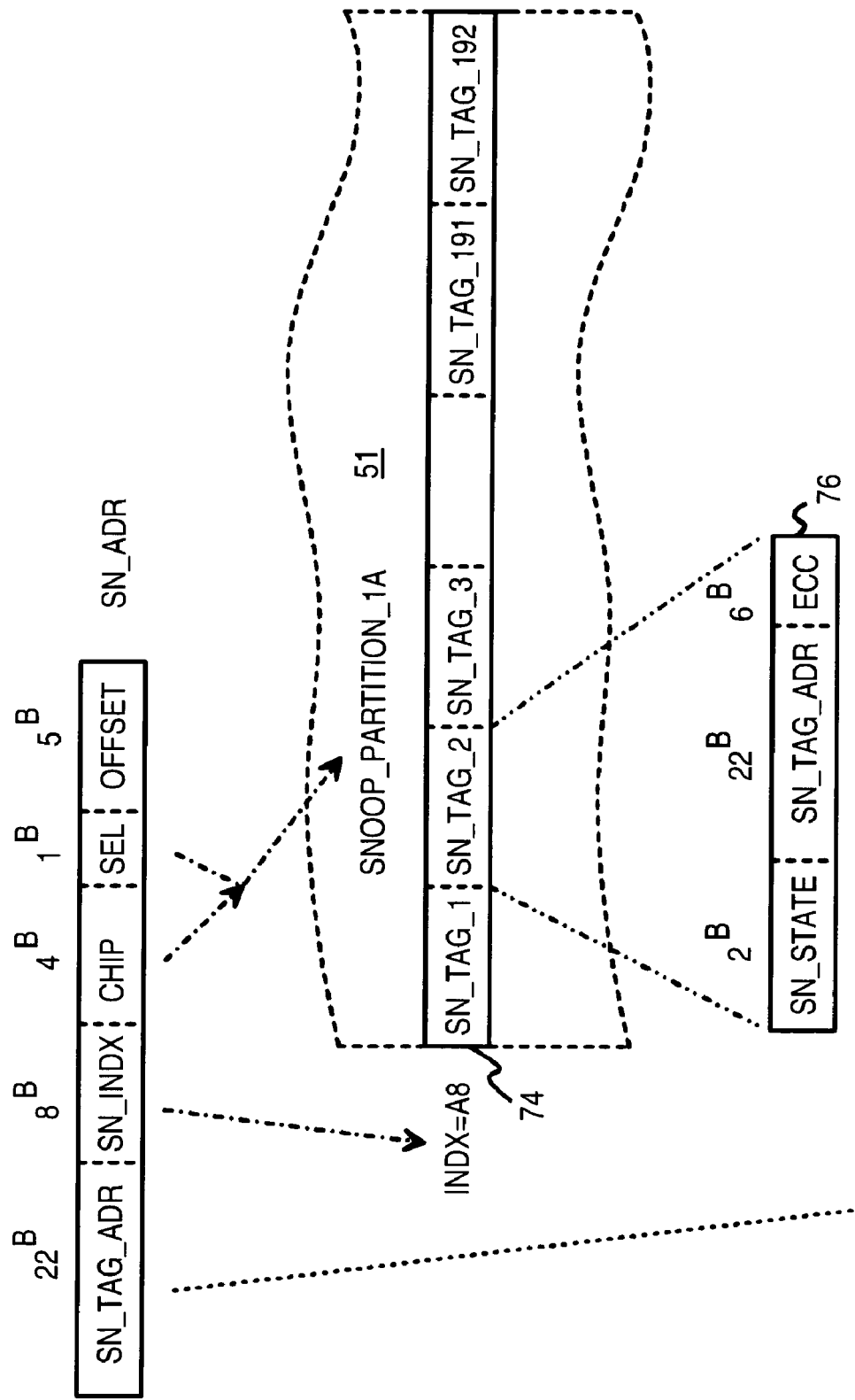
FIG. 9 shows a snoop line of 192 snoop tag entries in one of the snoop tag partitions.

FIG. 9 shows a snoop line of 192 snoop tag entries in one of the snoop tag partitions. The 8-bit snoop index from the snoop address selects one of 256 rows or sets within a selected snoop tag partition. Selected snoop tag partition 51 is one of the 32 snoop tag partitions, determined by the 4-bit chip-select bits and the interleave bit. Chip-select and interleave bits of value 00000 select first snoop tag partition 51.

Selected snoop line 74 has a snoop index value of A8 (hex). Selected snoop line 74 has 192 snoop tag entries SN_TAG_1, SN_TAG_2, . . . SN_TAG_192. The second of 4 ways in first local cache 61 maps to second snoop-tag entry 76, or SN_TAG_2, which has the 22 bits from the stored snoop tag address matching the request's snoop address. Second snoop-tag entry 76 has 2 bits of state and can also have error-correction code (ECC) bits.

Figure 10:
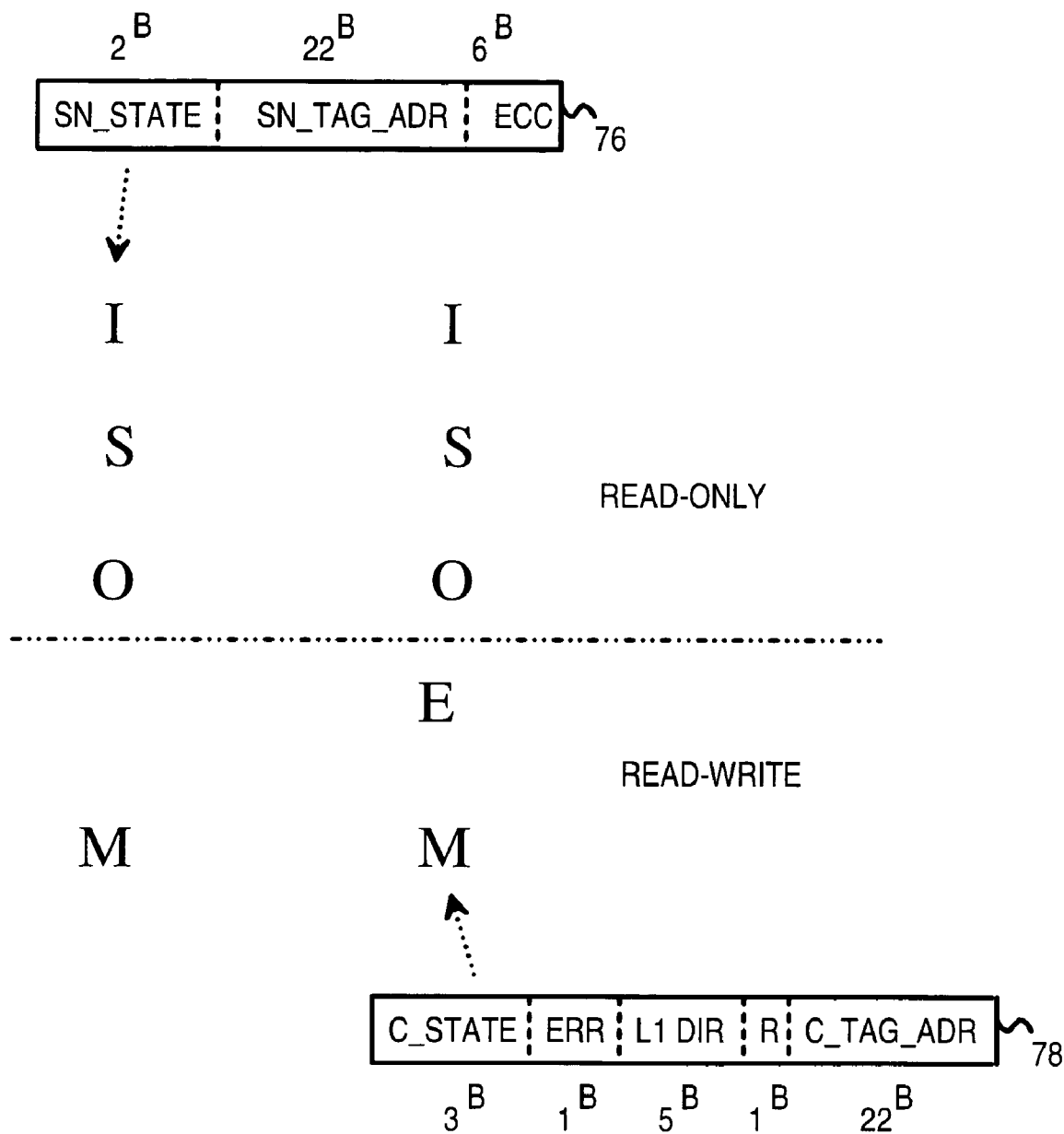
FIG. 10 shows corresponding cache-line states in the local caches and in the snoop tag partitions.

FIG. 10 shows corresponding cache-line states in the local caches and in the snoop tag partitions. I don't want to go into a lot of detail here. A general overview is OK.} Snoop-tag entry 76 has a 2-bit state of the cache line in the local cache, while cache line entry 78 has a 3-bit cache-line state, along with the 22-bit cache tag, an error bit, and level-1 (L1) directory bits or other cache-management bits.

For instruction fetches, memory data is loaded into a local cache in a read-only state such as shared (S) or owner (O). For read/write data accesses such as loads and stores, data from the main memory can be loaded into the cache with a state of modified (M) for stores, or exclusive (E). Old cache lines can be invalidated to the I state.

The exclusive state exists only in the local cache entry, not in the snoop tag entry. The snoop tag state has only two bits, and has only the four states I, S, O, M. In contrast, the local cache has three state bits and has five states I, S, O, E, M. When the local cache is in the exclusive (E) state, the snoop tag is in the modified (M) state. This is pessimistic since the cache line in the exclusive (E) state may be either clean (not yet written by the local CPU) or dirty (written to by a local CPU), while the modified (M) state indicates that the cache line is definitely dirty.

The local cache does not have to report back to the snoop tag partition when the CPU writes to a clean line. The clean cache line in the exclusive (E) state is changed to the modified (M) state when the CPU writes to the cache line, but reporting to the snoop tag partition is not needed since the snoop tag partition was already in the M state since the E state does not exist in the snoop tag partitions. Thus the lack of the E state in the snoop tag partitions reduces bandwidth since the snoop tag partitions do not have to be notified each time a CPU writes to a clean cache line in the E state.

When a local cache requests a new cache line due to a store from its local CPU, the line is loaded into the local cache in the M state. This is a read-M request.

When the local cache requests a new cache line due to a load (program reading data) from its local CPU, the line is loaded into the local cache in the E, S, or O states. This is a read-exclusive-shared-owned (read-ESO) request.

When the local cache requests a new cache line due to an instruction fetch from its local CPU, the line is loaded into the local cache in the S, or O states. This is a read-shared-owned (read-SO) request.

Figure 11:
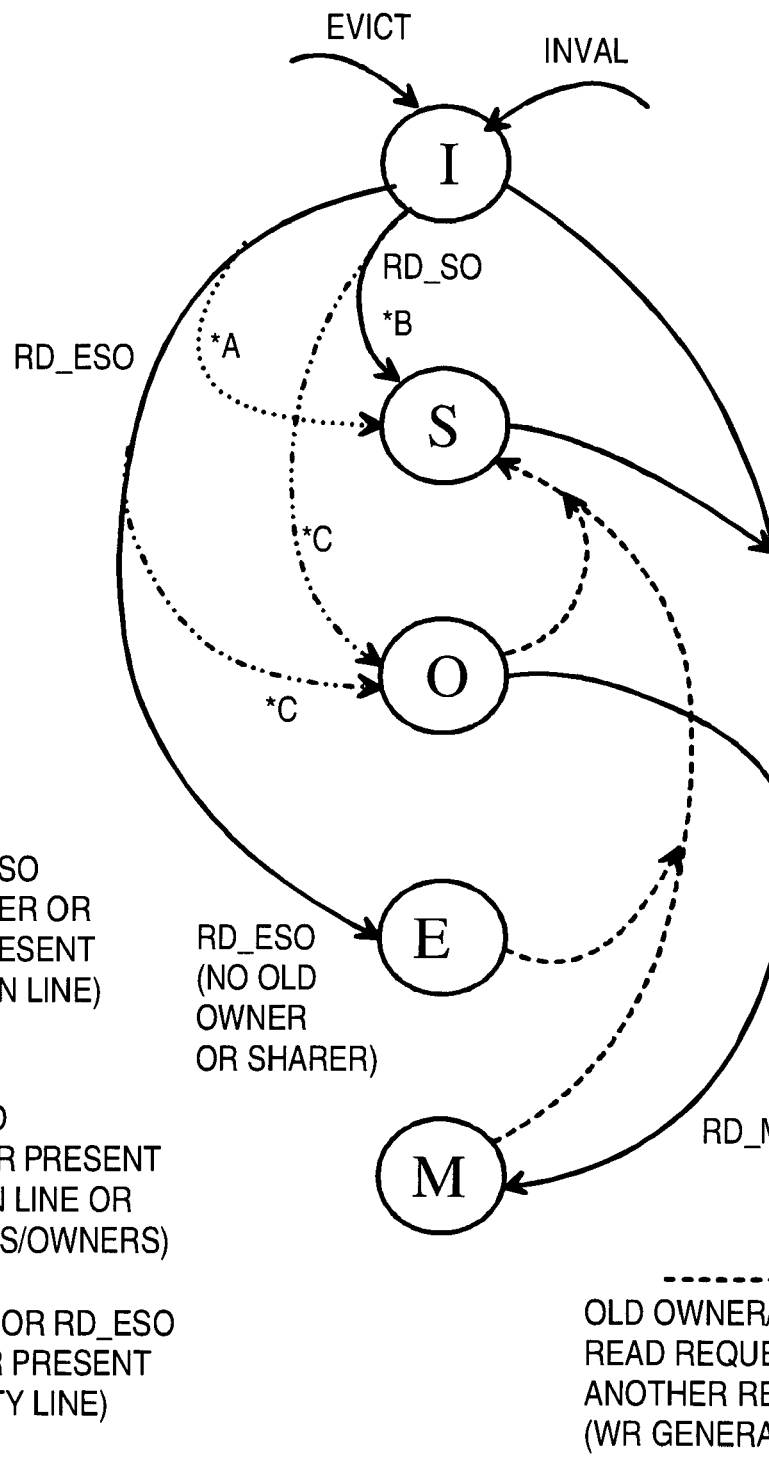
FIG. 11 is a diagram of state transitions for cache lines in a local cache.

FIG. 11 is a diagram of state transitions for cache lines in a local cache. A cache line can be evicted when it is the least-recently-used of the 4 entries in the selected set, or during a cache flush or other operation. A cache line is invalidated when another local cache has a CPU writing to that cache line. The invalid (I) state is the initial or reset state.

The modified (M) state is entered from any other state when the local CPU requests writing to the cache line. This is known as a read-modify RD_M operation. All other copies of that cache line in other local caches are invalidated so that the cache line in the M state is the only copy of the line. The data in main memory becomes stale after a write and must eventually be updated by a write-back of the dirty cache line to memory.

For read-only data or instruction fetches, a RD_SO operation is performed. The cache line is installed as a shared (S) line when no other cache owns the line. When another cache owns the line, the old owner is changed to the shared (S) state while the requestor is changed to the owner (O) state if the line was dirty, or the shared state if the line was still clean.

For cache lines installed for read/write data, the RD_ESO operation can be performed. When there are no old owners of the cache line, the requestor enters the exclusive (E) state. When an old owner has written to the (dirty) line, the dirty line is copied to the requestors cache and installed in the owner state. The old owner is downgraded to the sharer state. When the owner had not yet written to the line (clean), the requestor installs the line in the shared state. Also when only sharers but no owners are present, the shared state is entered by the requester.

Figure 12:
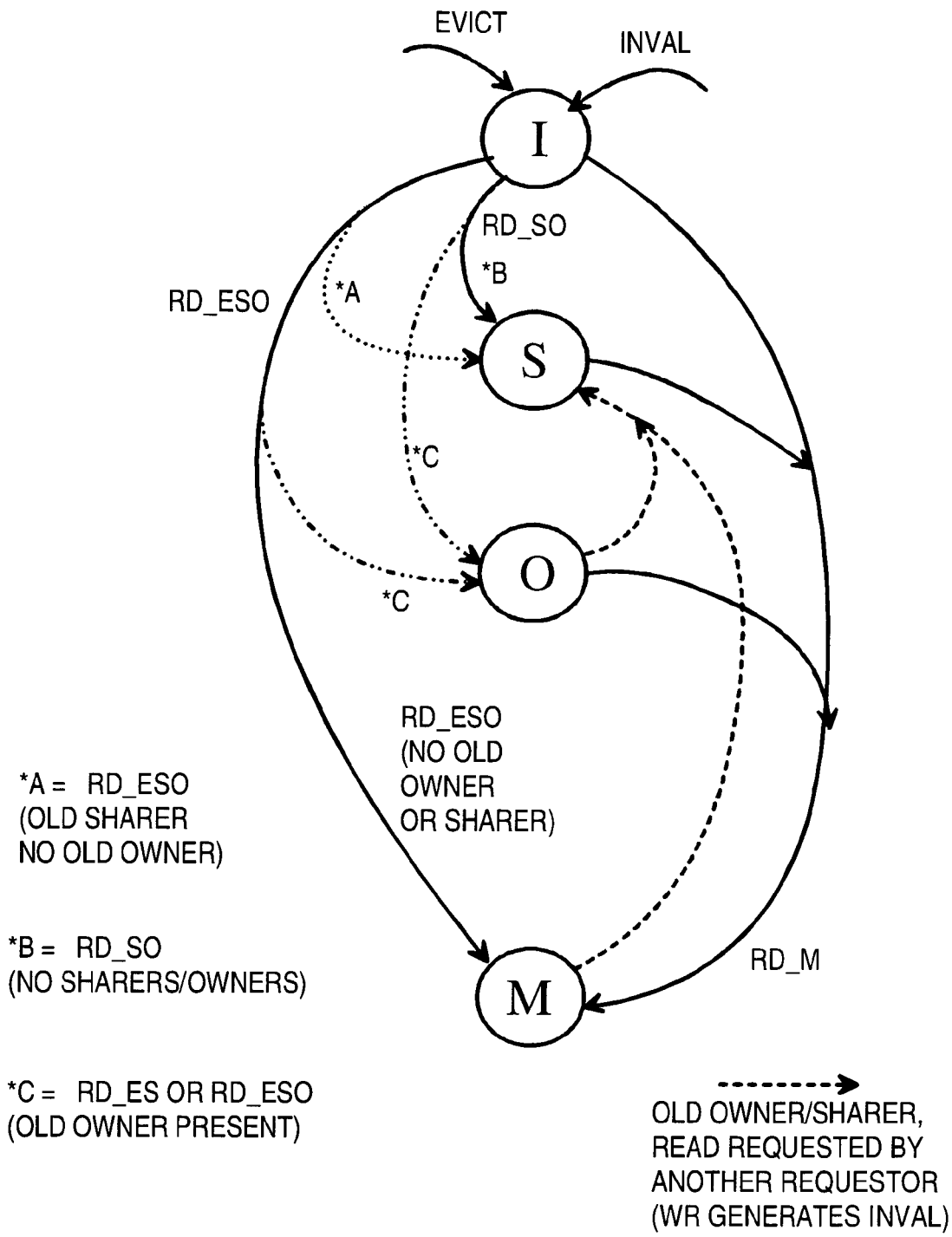
FIG. 12 is a diagram of state transitions within the snoop tag partitions for cache lines.

FIG. 12 is a diagram of state transitions within the snoop tag partitions for cache lines. Since snoop tag entries have only 2 state bits, a maximum of 4 states are possible. The exclusive (E) state is not present in the snoop tag partitions. Instead, when the local cache line is in the exclusive (E) state, the snoop tag partition is in the modified (M) state.

The RD_ESO request causes the local cache to enter the E state when no other local cache has a copy of the line. The snoop tag entry for this line is placed in the M state.

Another difference with FIG. 11 is that the state of the old owner's cache line, dirty or clean, is not considered by the snoop tag partitions. Instead, if an old owner is present, the requestor's snoop entry enters the O state regardless of whether the line was dirty or clean. For a clean line, the requestor's new state in the local cache (FIG. 11) is shared (S) while the new state in the snoop tag entry is owner (O). The snoop tag partition is more pessimistic in this instance. This can occur for both RD_SO and RD_ESO requests when the old owner has a clean line. Otherwise, state transitions are similar in FIGS. 11, 12.

Alternate Embodiments

Several other embodiments are contemplated by the inventors. For example many variations in cache and snoop tag arrangements are possible. The memory controller and snoop tag can be on different chips from the CPU and it's caches. Nothing can be on the same chip or the entire system can be on one chip. Different address widths other than 40 bits are possible, and some address bits may be implied, such as when data is aligned to 4-byte or other boundaries. The number of bits for different address portions (tag, offset, index, etc.) can be varied in many ways. Addresses may be snoop addresses, cache addresses main-memory addresses, or other addresses or some combination and may have portions of another address or be altered during operations. Addresses may be carried by various buses and may not fit into a precise category of addresses since the address may be generated by the cache and sent to the snoop tags or vice-versa.

The interconnect buses could be a mesh of point-to-point buses, or could have shared buses, switches, or other topographies. Buses to sockets for unpopulated cluster chips could be present on a motherboard but not used until the additional cluster chips are installed. The memory for the cache data, cache tags, and snoop tags may be arranged in a variety of ways, such as having separate memory blocks or using a shared memory block. Special associative memories such as content-addressable memories (CAM) may be used for tags for faster searching for a tag match, or each tag may be read and compared in a more conventional memory.

While local caches that are level-2 caches have been described, these local caches could be level-3 caches or level-1 caches or some combination of caches of different levels, depending on the processor cache architecture. Local caches could be shared among two or more processors, and the number and arrangement of processors, caches, snoop tag partitions, and memory controllers could be changed. Snoop tags may or may not be tightly coupled with a memory controller. A pool of memory controllers could be used by the snoop tag partitions. Various arbitration or priority schemes could be added.

Other cache coherency schemes could be used having fewer or more states. Different kinds of requests and operations could be defined or supported.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A multi-processor system comprising:

a plurality of snoop tag partitions for storing snoop entries;

a plurality of external interconnect buses coupled between a plurality of snoop tag partitions, the plurality of external interconnect buses carrying cache coherency requests that include a snoop address;

a plurality of memory controllers coupled to a shared main memory;

a plurality of local processors for executing instructions and reading and writing data;

a plurality of local caches, coupled to the plurality of local processors, for storing cache entries that contain instructions or data used by the plurality of processors;

internal interconnect buses that couple the plurality of snoop tag partitions to the plurality of local caches and to the plurality of external interconnect buses;

wherein each snoop tag partition in the plurality of snoop tag partitions contains snoop entries arranged into snoop sets, wherein a snoop index selects one of the snoop sets as a selected snoop set, wherein all snoop entries within a snoop set have a same snoop index but are able to have different snoop tags;

wherein each local cache in the plurality of local caches contain cache entries arranged as multi-way cache sets, wherein a cache index selects one of the cache sets as a selected cache set, wherein all cache entries within a cache set have a same cache index but have different cache tags;

wherein the snoop address carried over the internal interconnect buses comprises a tag portion for matching with a cache tag, a cache-index portion having the cache index for selecting the selected cache set, and an offset portion of data within a selected cache entry, wherein the cache-index portion further comprises a snoop-index portion having the snoop index for selecting the selected snoop set, a chip-select portion, and an interleave portion;

wherein the chip-select portion of the cache-index portion of the snoop address selects a selected group of snoop tag partitions in the plurality of snoop tag partitions;

wherein the interleave portion of the cache-index portion of the snoop address selects a selected snoop tag partition in the plurality of snoop tag partitions within the selected group of snoop tag partitions;

wherein the selected snoop tag partition responds to the cache coherency request having the snoop address and stores a snoop tag in a snoop entry within the selected snoop set selected by the snoop index;

wherein other snoop tag partitions do not respond to the cache coherency request, wherein the selected snoop tag partition is selected by the chip-select portion and the interleave portion of the snoop address which are subsets of the cache index, whereby processing of snoop requests are partitioned across the plurality of snoop tag partitions by the chip-select portion of the snoop address.

2. A multi-processor system comprising:

a plurality of clusters coupled to a shared main memory;

a plurality of external interconnect buses coupled between the plurality of clusters, the plurality of external interconnect buses carrying cache coherency requests that include a snoop address;

wherein each of the plurality of clusters comprises:

a plurality of memory controllers coupled to the shared main memory;

a plurality of local processors for executing instructions and reading and writing data;

a plurality of local caches, coupled to the plurality of local processors, for storing cache entries that contain instructions or data used by the plurality of processors;

a plurality of snoop tag partitions for storing snoop entries;

internal interconnect buses that couple the plurality of snoop tag partitions to the plurality of local caches and to the plurality of external interconnect buses;

wherein each snoop tag partition in the plurality of snoop tag partitions contains snoop entries arranged into snoop sets, wherein a snoop index selects one of the snoop sets as a selected snoop set, wherein all snoop entries within a snoop set have a same snoop index but are able to have different snoop tags;

wherein each local cache in the plurality of local caches contain cache entries arranged as multi-way cache sets, wherein a cache index selects one of the cache sets as a selected cache set, wherein all cache entries within a cache set have a same cache index but have different cache tags;

wherein the snoop address carried over the internal interconnect buses comprises a tag portion for matching with a cache tag, a cache-index portion having the cache index for selecting the selected cache set, and an offset portion of data within a selected cache entry, wherein the cache-index portion further comprises a snoop-index portion having the snoop index for selecting the selected snoop set, a chip-select portion, and an interleave portion;

wherein the chip-select portion of the snoop address selects a selected cluster in the plurality of clusters;

wherein the interleave portion of the snoop address selects a selected snoop tag partition in the plurality of snoop tag partitions within the selected cluster;

wherein the selected snoop tag partition responds to the cache coherency request having the snoop address and stores a snoop tag in a snoop entry within the selected snoop set selected by the snoop index;

wherein other snoop tag partitions do not respond to the cache coherency request, wherein the selected snoop tag partition is selected by the chip-select portion and the interleave portion of the snoop address which are subsets of the cache index, whereby processing of snoop requests are partitioned across the plurality of clusters by the chip-select portion of the snoop address.

3. The multi-processor system of claim 2 wherein each snoop entry stores a snoop tag;

wherein each cache entry stores a cache tag;

wherein the tag portion of the snoop address has a same number of address bits as the snoop tag and as the cache tag, wherein the tag portion matches the cache tag of the selected cache entry;

wherein the tag portion is matched with the snoop tag of a selected snoop entry in the selected snoop set, whereby cache tags and snoop tags are a same size and interchangeable.

4. The multi-processor system of claim 2 wherein a number of the snoop entries per snoop set in one snoop tag partition in the plurality of snoop tag partitions is equal to a number of the cache entries per cache set multiplied by a number of local caches in the plurality of local caches multiplied by a number of clusters in the plurality of clusters, wherein a total number of the snoop entries in the multi-processor system equals a total number of cache entries in all of the local caches in the plurality of local caches in the multi-processor system.

5. The multi-processor system of claim 2 wherein the plurality of clusters comprises N cluster chips, wherein N is a whole number;

wherein the multi-processor system is expandable by adding additional cluster chips to the multi-processor system and by increasing a number of address bits in the chip-select portion and decreasing a number of address bits in the snoop-index portion of the snoop address.

6. The multi-processor system of claim 5 wherein N is expandable from 1 to 16 and wherein the plurality of local caches comprises M local caches for each cluster;

wherein each cache set comprises W cache entries;

wherein each snoop set comprises Q snoop entries, wherein Q is equal to N*M*W;

wherein M, W, and Q are whole numbers.

7. The multi-processor system of claim 6 wherein W is 4 or 8, wherein each local cache is a 4-way or an 8-way set-associative cache.

8. The multi-processor system of claim 7 wherein the plurality of snoop tag partitions comprises S snoop tag partitions on each cluster;

wherein a number of address bits in the interleave portion of the snoop address is B, wherein S is equal to $2^B$;

wherein S and B are whole numbers.

9. The multi-processor system of claim 8 wherein a number of address bits in the chip-select portion of the snoop address is C, wherein N is equal to $2^C$;

wherein C and N are whole numbers.

10. The multi-processor system of claim 9 wherein a number of address bits in the cache-index portion of the snoop address is D, wherein there are $2^D$ cache sets in each local cache;

wherein a number of address bits in the snoop-index portion of the snoop address is F, wherein there are $2^F$ snoop sets in each snoop tag partition;

wherein D is equal to F+B+C, wherein B, C, D, and F are whole numbers.

11. The multi-processor system of claim 10 wherein S is 2, M is 3, W is 4, and N is 16;

wherein each snoop set in each snoop tag partition has 192 snoop entries.

12. The multi-processor system of claim 8 wherein each memory controller in the plurality of memory controllers is tightly coupled to a snoop tag partition in the plurality of snoop tag partitions, wherein snoop addresses mapping to a snoop tag partition by the chip-select and interleave portions of the snoop address have memory accesses processed by a memory controller tightly coupled to the snoop tag partition, wherein each memory controller is for accessing a partition of a memory space in the shared main memory, wherein the partition is 1/(N*S) of the memory space.

13. The multi-processor system of claim 12 wherein each snoop entry stores the snoop tag and a snoop state of a corresponding cache line having a cache tag matching the snoop tag;

wherein each cache entry stores the cache tag and a cache state of the corresponding cache line;

wherein the snoop state is invalid, shared, owner, or modified;

wherein the cache state is invalid, shared, owner, exclusive, or modified;

wherein the snoop state is encoded by two state bits, but the cache state is encoded by 3 state bits.

14. The multi-processor system of claim 13 wherein the snoop state is modified when the cache state is exclusive or the cache state is modified.

15. A coherent multi-chip multi-processor system comprising:

a main memory;

an external interconnect among cluster chips including a first cluster chip, a second cluster chip, a third cluster chip, and an Nth cluster chip;

wherein the first, second, third, and Nth cluster chip each comprise:

a first memory controller for accessing the main memory;

a second memory controller for accessing the main memory;

a snoop interconnect coupled to the external interconnect;

a first snoop tag partition, coupled to the first memory controller and to the snoop interconnect, for storing snoop entries in snoop sets selected by a snoop index in an address, each snoop entry for storing a snoop tag from the address or that matches a tag portion of the address;

a second snoop tag partition, coupled to the second memory controller and to the snoop interconnect, for storing snoop entries in snoop sets selected by the snoop index in an address, each snoop entry for storing a snoop tag from the address or that matches the tag portion of the address;

wherein each snoop set identified by a corresponding snoop index stores snoop entries for all caches in the coherent multi-chip multi-processor system for a corresponding cache index that has the corresponding snoop index as a subset;

wherein a cache index in the address contains an interleave bit that is not in the snoop index, the interleave bit selecting either the first snoop tag partition or the second snoop tag partition for storing the snoop entry for the address;

a first processor for executing instructions;

a second processor for executing instructions;

a first local cache, coupled between the first processor and the snoop interconnect, for storing cache entries that each store a cache tag and data; and a second local cache, coupled between the second processor and the snoop interconnect, for storing cache entries that each store a cache tag and data;

wherein the cache entries are arranged into cache sets each having at least four associative cache entries with a same cache index but different cache tags and data, wherein the cache index selects a cache set in a local cache;

wherein the address comprises a tag portion for matching with or storing as the snoop tag and as the cache tag, and the cache index;

wherein the cache index in the address comprises the snoop index, chip-select bits, and the interleave bit;

wherein N is a whole number;

wherein the chip-select bits in the address select the first and second snoop tag partitions in either the first cluster chip, the second cluster chip, the third cluster chip, or the Nth cluster chip for storing the snoop entry for the address, whereby the chip-select bits in the address select a cluster chip while the interleave bit selects a snoop tag partition for storing the snoop entry for the address.

16. The coherent multi-chip multi-processor system of claim 15 wherein each cluster chip further comprises:

a third processor for executing instructions;

a third local cache, coupled between the third processor and the snoop interconnect, for storing cache entries that each store a cache tag and data;

wherein each snoop set identified by a corresponding snoop index stores at least N*12 snoop entries, wherein N is a whole number indicating a number of cluster chips in the coherent multi-chip multi-processor system.

17. The coherent multi-chip multi-processor system of claim 15 wherein a number of chip-select bits is B, wherein B is a whole number, and wherein N is $2^B$ cluster chips;

wherein the cache index has B+1 more address bits than the snoop index.

18. A processing cluster chip for a multiprocessing system comprising:

first memory controller means for accessing a memory;

first snoop tag partition means, coupled to the first memory controller means, for storing snoop tags in snoop entries arranged in snoop sets selected by a snoop index of an address;

second memory controller means for accessing a memory;

second snoop tag partition means, coupled to the second memory controller means, for storing snoop tags in snoop entries arranged in snoop sets selected by a snoop index of an address;

interconnect means for connecting the first and second snoop tag partition means to caches on other processing cluster chips and to local caches;

first processor means for executing programmable instructions;

first cache means, between the interconnect means and the first processor means, for storing data from the memory in cache entries arranged in cache sets selected by a cache index of the address;

second processor means for executing programmable instructions;

second cache means, between the interconnect means and the second processor means, for storing data from the memory in cache entries arranged in cache sets selected by a cache index of the address, third processor means for executing programmable instructions; and third cache means, between the interconnect means and the third processor means, for storing data from the memory in cache entries arranged in cache sets selected by a cache index of the address, wherein each cache set contains 4 cache entries and each cache entry contains a cache tag, a dirty bit, and data;

wherein the address contains tag bits forming the cache tag or the snoop tag, and a cache index for selecting the cache set;

wherein the cache index contains the snoop index and chip-select bits and an interleave bit;

wherein the interleave bit in the address selects the first snoop tag partition means for processing a request using the address when the interleave bit is in a first state, and the interleave bit in the address selects the second snoop tag partition means for processing the request using the address when the interleave bit is in a second state;

wherein the chip-select bits in the address select a processing cluster chip that contains a selected snoop tag partition means for processing the request using the address;

whereby the chip-select and interleave bits in the address select the first or second snoop tag partition means and the processing cluster chip for processing the request.

19. The processing cluster chip for a multiprocessing system of claim 18 wherein the multiprocessing system comprises N processing cluster chips;

wherein each snoop set comprises N*4*3 snoop entries, one snoop entry for each cache entry for a selected cache index for all processing cluster chips in the multiprocessing system.

20. The processing cluster chip of claim 19 wherein each cache entry stores a 3-bit state of the data, while each snoop entry stores a 2-bit state of the data stored in the cache entry.

* * * * *